United States Patent Office 2,744,775
Patented May 8, 1956

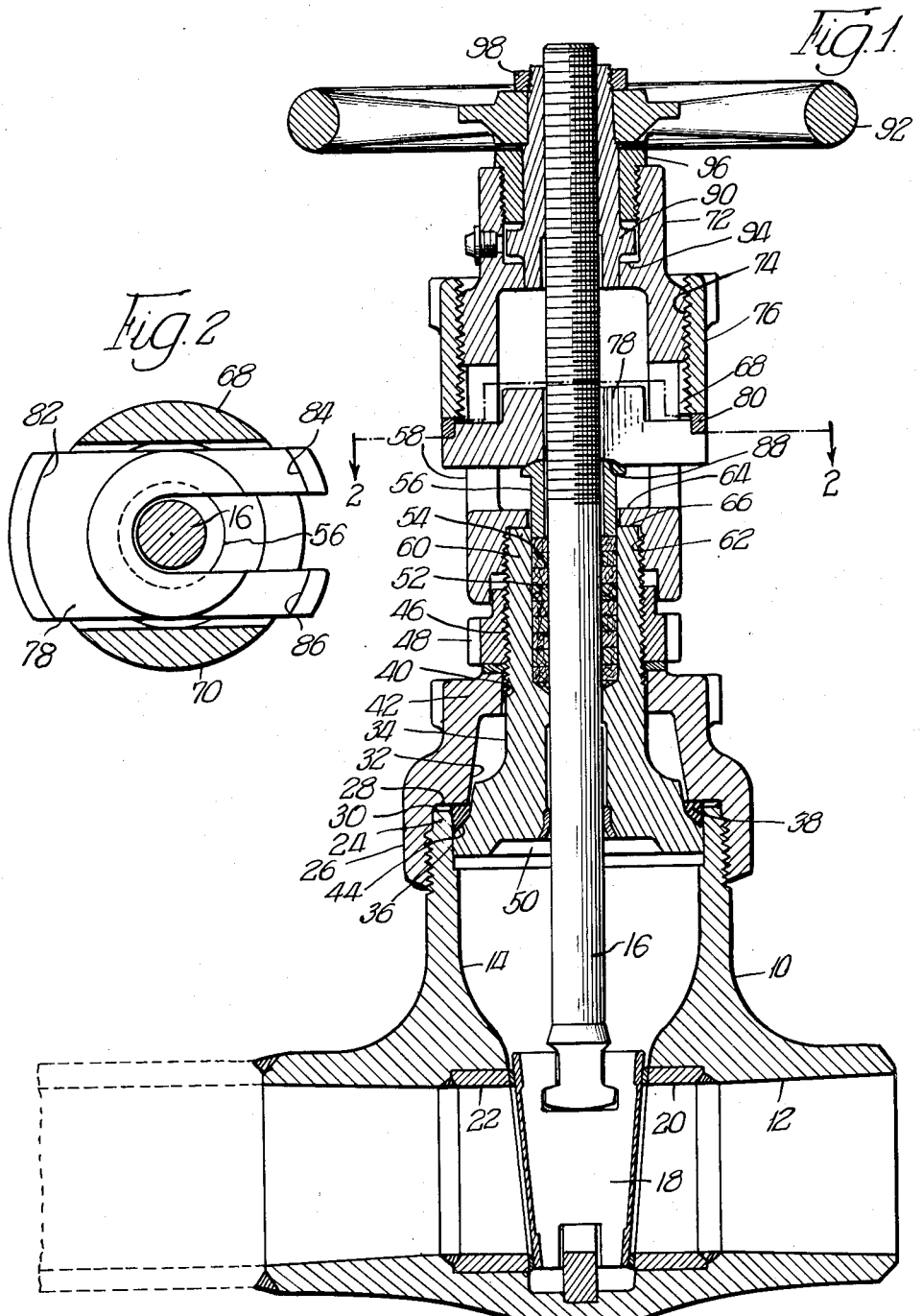

2,744,775

VALVE CONSTRUCTION

Kurt E. B. Bredtschneider, Chicago, Ill., assignor to Crane Co., Chicago, Ill., a corporation of Illinois Application September 23, 1950, Serial No. 186,337

5 Claims. (Cl. 286—31)

This invention relates to fluid valves and more particularly to bonnet valves having a stuffing box for forming a seal between the bonnet member and a stem member extending therethrough.

Many forms of such valves have been designed in the past, and it has been customary to provide in addition to the bonnet member a yoke member which is secured to the body member, usually in encompassing relation to the bonnet member. This type of construction, by its very nature, has made it somewhat difficult ordinarily to provide ready access to the previously mentioned stuffing box. For example, a gland member is ordinarily utilized to exert pressure on the sealing material disposed in the stuffing box and the mechanism which is utilized to force the gland member into pressure exerting relation with the contents of the stuffing box is ordinarily disposed within the yoke member, and can therefore be reached only through suitable openings provided in the latter. In addition a common method of permitting the tightening of the gland member has been to provide a plurality of bolt members which must be carefully tightened in sequence in order to produce a balanced pressure and thus prevent undesirable canting of the gland member.

In these prior types of construction it has also been normally quite difficult to remove and replace the packing in the stuffing box because of its relative inaccessibility. The cooperative relation of the bonnet member and the yoke member has usually been such that the yoke member could not be entirely removed from association with the body of the valve and the bonnet member so as to permit ready access to the stuffing box.

It is, therefore, an object of this invention to provide a valve construction in which the yoke member is secured to the bonnet member rather than to the main body of the valve.

Another object is to provide a valve construction in which the tightening of the packing in the stuffing box may be performed outside of the yoke member and without any danger of canting the gland member used to exert pressure on the packing.

Still another object of this invention is to provide a valve construction in which a portion of the assembly which applies pressure to the gland member may be removed laterally to provide additional clearance for the inspection and maintenance of the stuffing box. In addition, the whole valve assembly above the stuffing box may be readily removed from association with the remainder of the valve, with the exception of the stem member, and the stuffing box may be therefore repacked even with continuous rings if desired.

A further object of this invention is to provide a valve construction which enables the yoke member to be both relatively small and simple to cast and yet which is adapted for use with high pressures.

Yet another object is to provide a valve construction in which the stem member is exceptionally well protected against exposure to weather conditions and the like.

Further objects and advantages of this invention will become evident as the description proceeds and from an examination of the accompanying drawings which illustrate one embodiment of the invention and in which similar numerals refer to similar parts.

In the drawings:

Figure 1 is a view in elevation, and partly in vertical section, of one form of valve assembly embodying this invention;

Figure 2 is a detail view in horizontal section of a portion of the valve shown in Figure 1, the view being taken along the line 2—2 of Figure 1.

Referring now to Figure 1, a so-called pressure-seal bonnet valve is illustrated therein having a body portion 10 which is provided with a through flow passage 12 and a valve receiving opening 14 opening therein. The valve stem member 16 is disposed in the opening 14 and carries at its lower end the wedge disk 18 which is adapted to be seated on the body seat rings 20 and 22 to close the flow passage 12, as desired. The lip 24 formed at the upper end of that portion of the body 10 having the opening 14 therein has the outer member or cap member 26 threadedly secured to the outer wall thereof. This outer member 26 is provided with the radially disposed annular surface 28, which is adapted to be disposed in spaced and opposing relation to the upper end 30 of the lip member 24. The surface 28 is of greater width than the lip member 24 and, therefore, projects slightly inwardly into the opening 14.

Immediately above the annular surface 28 of the outer member 26 a chamber 32 is formed which is adapted to have the intermediate portion of the inner member 34 slidably disposed therein. The lower portion of the inner member 34 is disposed within the opening 14 in the body 10 and is provided with an annular lip 36 having an angularly disposed bearing surface 44 formed on the upper edge thereof. The opposite end of the inner member 34 projects upwardly through the opening 40 in the upper end of the outer member 26 and is free to move longitudinally therethrough. A sealing ring 38 is disposed between the bearing surface 44 on the inner member 34 and the surface 28 on the outer member 26, which ring is adapted to be pressed to form a seal between the inner member and the wall of the opening 14 in a manner which will be subsequently described.

The outer member 26 has an annular shoulder 42 formed about the opening 40 through which the inner member 34 projects. The upper end 60 of the inner member 34 is provided with the continuous threads 46 and the internally threaded abutment ring 48 is in turn adapted to be moved into abutting relation with the annular shoulder 42 on the outer member 26 so that by tightening the abutment ring the inner member 34 may be drawn upwardly relative to the outer member 26. Such a displacement of the inner member 34 will cause the sealing ring 38 to be compressed between the bearing surfaces 28 and 44 on the outer member 26 and the inner member 34, respectively. The resulting compression of the sealing ring 38 will cause it to be distorted and forced outwardly against the wall of the opening 14 and to form a seal thereagainst.

Because of the unusual construction of this pressure seal portion of the valve, pressure applied to the base 50 of the inner member 34 by fluid in the opening 14 will serve to increase the tightness of the seal formed between the sealing ring 38 and the wall of the opening 14. It is, therefore, only necessary in a valve of this construction to first tighten the abutment ring 48 sufficiently to form a preliminary seal between the sealing ring 38 and the wall of the opening 14. This seal is then subsequently made even more positive by the pressure applied to the base 50 of the inner member 34 by the fluid controlled by the valve member.

The valve stem 16 previously mentioned as being disposed in the opening 14 is also slidably mounted in the inner member 34 so that it is freely rotatable and movable longitudinally therein. A suitable seal between the inner member 34 and the stem 16 is provided by the stuffing box 52 having the packing 54 disposed therein in the form of a plurality of superposed continuous rings. The packing is adapted to be compressed longitudinally by the gland member 56 which encompasses the stem 16 and which is adapted to be received by the stuffing box 52.

The yoke member 58 is independent of the outer member 26 and is adapted to be threaded onto the upper end 60 of the inner member 34, the internal threads 62 on the yoke member 58 engaging the external threads 46 on the inner member 34. An inwardly projecting annular shoulder 64 is provided on the yoke 58 immediately above the threads 62 which shoulder is adapted to abut the upper end 66 of the end 60 of the inner member 34. The yoke member 58 has a pair of upstanding oppositely disposed arms 68 and 70 shown in cross section in Figure 2, which arms support the upper portion 72 of the yoke member. This upper portion 72 is provided with the external threads 74 which are adapted to threadedly receive the internally threaded sleeve member 76.

As best shown in Figure 2 a substantially U-shaped bearing plate 78 may be inserted between the arms 68 and 70 so that the stem 16 is recieved therein and the sleeve 76 may then be screwed downwardly until it abuts the washer 80, which is disposed in the grooves 82, 84 and 86 provided for that purpose in the peripheral edge of the bearing plate 78. The bottom of the bearing plate 78 has a bevelled edge 88 formed around the base of the opening between the two arms of the U and the upper edge of the gland member 56 is adapted to ride therein, as best shown in Figure 1. Obviously a downward movement of the sleeve 76 on the upper portion 72 of the yoke member 58 will exert pressure on the washer 80, which pressure will in turn be transmitted to thhe bearing plate 78 at the three points of contact with the washer 80. Pressure thus applied to the bearing plate will in turn be transmitted to the gland 56 and the superposed packing rings 54 in the stuffing box 52 may thus be compressed sufficiently to form a seal between the inner member 34 and the stem 16.

The upper end 72 of the yoke 58 also forms a housing for the sleeve 90 which sleeve is keyed to the hand wheel 92. The sleeve 90 is internally threaded on the stem 16 and is held against longitudinal movement by the shoulder 94 on the yoke 58 and by the collar 96 which is threadedly secured to the upper extremity of the upper portion 72 of the yoke 58. Although the sleeve 90 is not movable longitudinally, it is freely rotatable and will cause the stem 16 to move upwardly or downwardly depending on the direction of rotation. The hand wheel 92 is secured in place on the sleeve 90 by the locking nut 98 and provides a convenient means of rotating the sleeve as desired.

It may readily be seen that a valve constructed as described provides a very accessible and convenient means for tightening the stuffing box and likewise produce a minimum of interference with the portion of the valve which forms the pressure seal between the bonnet and the main body of the valve. In other words the two members which are most likely to need adjustment are completely exposed, namely, the abutment ring 48 and the sleeve member 76.

In addition, as previously pointed out, the whole assembly above the inner member 34, with the exception of the stem 16, may be quickly and easily removed from association with the remaining portion of the valve. By removing the lock nut 98 and the hand wheel 92, the sleeve 90 may be disengaged from the stem 16 and the yoke member 58 together with the sleeve 76 may be then disengaged from the inner member 34. The gland member 56 may then be moved entirely out of association with the stem 16, if desired, and the stuffing box 52 will then be completely accessible for inspection and repacking with even continuous rings, if desired. All of this can take place without disturbing the pressure seal between the inner member 34 and the main body 10, which, of course, is a distinct advantage.

The use of the pressure bearing plate 78 and the sleeve 76 which is adapted to control the position thereof, gives a desirable stability to the adjustment of the gland member 56 and also eliminates the exposed bolts which are commonly used to carry out this adjustment and which are easily broken and therefore a source of maintenance difficulty.

The drawings and the above discussion are not intended to represent the only possible forms of this invention, in regard to details of construction. Changes in form and in the proportion of parts, as well as the substitution of equivalents, are contemplated, as circumstances may suggest or render expedient, without departing from the spirit or scope of this invention as further defined in the following claims.

What is claimed is:

1. In a valve having a body member, an actuating stem, a supporting member for said stem and a stuffing box in said supporting member, a packing assembly for said stem comprising a gland member slidably encompassing said stem and adapted to be moved into operable relation with said stuffing box, a substantially U-shaped pressure plate member adapted to be moved laterally into and out of association with said stem member and to bear against said gland member, a peripheral shoulder on said pressure plate member, a ring member adapted to abut said peripheral shoulder, and an adjustable collar member adapted to abut said ring member on said peripheral shoulder of said pressure plate member and to exert pressure as desired on the latter member.

2. In a valve having a body member, an actuating stem, a supporting member for said stem and a stuffing box in said supporting member, a packing assembly for said stem comprising a gland member slidably encompassing said stem and adapted to be moved into operable relation with said stuffing box, a substantially U-shaped pressure plate member adapted to be moved laterally into and out of association with said stem member and to bear against said gland member, the ends of said plate member being segments of a circle and having a peripheral shoulder formed thereon, a ring member adapted to abut said peripheral shoulder, and an adjustable collar member adapted to abut said ring member on said peripheral shoulder of said pressure plate member and to exert pressure as desired on the latter member.

3. In a valve having a body member, an actuating stem, a supporting member for said stem and a stuffing box in said supporting member, a packing assembly for said stem comprising a gland member slidably encompassing said stem and adapted to be moved into operable relation with said stuffing box, a substantially U-shaped pressure plate member adapted to be moved laterally into and out of association with said stem member and to bear against said gland member, the ends of said plate member being segments of a circle and having a peripheral shoulder formed thereon, a ring member adapted to abut said peripheral shoulder, an internally threaded adjustable collar member adapted to abut said ring member on said peripheral shoulder of said pressure plate member and to exert pressure as desired on the latter member, said collar member being threadedly received on an externally threaded portion of said supporting member and movable along the longitudinal axis of said stem member when rotated.

4. In a valve having a body member, an actuating stem, a supporting member for said stem and a stuffing box in said supporting member, a packing assembly for said stem comprising a gland member slidably encompassing said stem and adapted to be moved into operable relation with said stuffing box, a substantially U-shaped pressure plate member adapted to be moved laterally into and out of association with said stem member and to bear against said gland member, said actuating stem being normally received in the inner extremity of the slot formed by the two arms of said U-shaped plate member, the ends of said plate member being segments of a circle, the center of which coincides with the longitudinal axis of said actuating stem when the latter is so received in said slot, a shoulder formed on the periphery of said ends of said plate member, a ring member adapted to abut said shoulder, and an adjustable collar member adapted to abut said ring member on said peripheral shoulder of said pressure plate member and to exert pressure as desired on the latter member.

5. In a valve having a body member, an actuating stem, a supporting member for said stem and a stuffing box in said supporting member, a packing assembly for said stem comprising a gland member slidably encompassing said stem and adapted to be moved into operable relation with said stuffing box, a substantially U-shaped pressure plate member adapted to be moved laterally into and out of association with said stem member and to bear against said gland member, said actuating stem being normally received in the inner extremity of the slot formed by the two arms of said U-shaped plate member, the ends of said plate member being segments of a circle, the center of which coincides with the longitudinal axis of said actuating stem when the latter is so received in said slot, a shoulder formed on the periphery of said ends of said plate member, a ring member adapted to abut said shoulder, an internally threaded adjustable collar member adapted to abut said ring member on said peripheral shoulder of said pressure plate member and to exert pressure as desired on the latter member, said collar member being threadedly received on an externally threaded portion of said supporting member and movable along the longitudinal axis of said stem member when rotated.

References Cited in the file of this patent

UNITED STATES PATENTS

| | | | |
|---|---|---|---|
| 1,573,108 | Williston | Feb. 16, | 1926 |
| 1,781,224 | Gilg | Nov. 11, | 1930 |
| 1,881,269 | Evans et al. | Oct. 4, | 1932 |
| 1,925,392 | La Bour | Sept. 5, | 1933 |
| 2,274,876 | Trott | Mar. 3, | 1942 |
| 2,350,208 | Zwishenberger | May 30, | 1944 |
| 2,373,020 | Doster | Apr. 3, | 1945 |